Patented Aug. 26, 1924.

1,506,316

UNITED STATES PATENT OFFICE.

EUGENE A. MARKUSH, OF JERSEY CITY, NEW JERSEY, ASSIGNOR TO PHARMA-CHEMICAL CORPORATION, A CORPORATION OF NEW YORK.

PYRAZOLONE DYE AND PROCESS OF MAKING THE SAME.

No Drawing.    Application filed January 9, 1923. Serial No. 611,637.

*To all whom it may concern:*

Be it known that I, EUGENE A. MARKUSH, a citizen of the United States, residing at Jersey City, in the county of Hudson and State of New Jersey, have invented certain new and useful Improvements in Pyrazolone Dyes and Processes of Making the Same, of which the following is a full, clear, and exact description.

I have discovered that the diazo compound of unsulphonated amidobenzol (aniline) or its homologues (such as toluidine, xylidine, etc.) in all their isomeric forms such as their ortho, meta and para compounds, or in their mixtures or halogen substitutes, may be coupled with halogen substituted pyrazolones (such as dichlorsulphophenylmethylpyrazolone or dichlorsulpho-phenyl-carboxylic-acid pyrazolone) to produce dyes which are exceptionally fast to light, which will dye wool and silk from an acidulated bath.

As an example of the manufacture of such a dye, 350 lbs. of dichlor-sulphophenyl-methyl pyrazolone may be dissolved in a solution formed of 200 lbs. of soda ash or sodium carbonate in 1600 lbs. of water. As soon as a clear solution is obtained 1250 lbs. or more of ice are added until the temperature is relatively low, preferably from 0° C. to 5° C. When the temperature of the solution has been reduced, a diazotized solution of 94.5 lbs. of aniline oil is added slowly, such as by a small stream, until a test shows that only a trace of the pyrazolone remains in excess to the diazonium compound. A considerable excess of pyrazolone is not objectionable, except that the excess is wasted.

The diazonium compounds are unstable at warm temperatures, and consequently they should be chilled and added to a chilled solution of the pyrazolone. The reacting mixture should also be maintained at low temperatures, preferably not materially above 5° C. for the best results. It is important that the diazotized aniline or homologue and halogen substitutes thereof, be added slowly, such as in a small stream, in order that the pyrazolone will remain in excess at all times. It is also important that the coupling or reaction be carried on in alkaline solution (or organic acid solution such as acetic acid) and it is for this reason that soda ash (sodium carbonate) or sodium acetate is utilized in the reacting mixture. Tests, such as with congo paper, should be taken at frequent intervals during the progress of the reaction to be sure that the solution remains alkaline or free from inorganic acids.

A satisfactory test for determining the presence of an excess of pyrazolone in the reacting mixture may be made as follows: A drop of the coupled solution is salted out on filter paper so that a colorless ring appears. A drop of the diazonium compound is then placed on the filter paper adjacent to the ring, so that if a color appears at the edges and junctions of both drops, an excess of the pyrazolone is indicated. The test is continued at intervals until but a very faint color is obtained on the filter paper which indicates that the coupling is finished with only a trace of pyrazolone in excess. Control tests may be applied with resorcinol solution (1 part resorcinol in 100 parts alcohol). If the colorless ring with resorcinol indicates a color, an excess of diazonium is present, which excess can be corrected with the addition of further pyrazolone to the reaction mixture.

After the completion of the coupling or reaction, the product is heated slowly, preferably until its temperature reaches approximately 80° C. to 85° C. The dye is then precipitated in any suitable manner, such as by the addition to the product of a concentrated salt solution. In the example given approximately 1800 lbs. of the solution will be necessary, and the density of the salt solution is preferably about 24° Bé. The dye will appear first as a heavy oil and when stirred will gradually crystallize. When the dye has been completely crystallized it is separated from the solution by filtering, and is then pressed and dried. The drying is preferably effected at a temperature of approximately 50° C. The dry dye is then pulverized, and standarized, such as with anhydrous sodium sulphate.

The diazotation of the aniline oil or homologue or halogen substitute thereof may be accomplished in any suitable manner, but the following practical example will indicate the principle involved: A quantitly of 94.5 lbs. of aniline oil or homologue thereof is dissolved in 269.5 lbs. of hydrochloric acid and 85 g. of water. Sufficient ice is added to cool the solution, preferably to approximately 0° C. A solution of about 70 lbs. of sodium nitrite in 350 lbs. of water is then added very slowly. The proportion of sodium nitrite which is necessary will vary somewhat, according to the purity of the aniline oil. The temperature of the mixture should be kept relatively low, preferably at or below approximately 5° C., and if necessary additional ice may be added to the solution for this purpose. The addition of the nitrite is continued until a clear but not excessive test for nitrite is indicated, as an excess of the nitrite should be avoided. This test may be obtained on starch iodide paper. The cooling of the reacting solutions is important because the diazonium salts are unstable and at warmer temperatures phenols instead of diazo compounds would be formed. The reacting solution should be alkaline or free from inorganic acids throughout the diazotation and this condition may be determined at intervals with congo paper.

As another example of the preparation of the novel dye, 350 lbs. of the pyrazolone may be dissolved in a solution of 200 lbs. of soda ash or carbonate in 1600 lbs. of water. When a clear solution is obtained 1250 or more lbs. of ice are added until the temperature of the solution is reduced to 5° C. or lower, preferably about 0° C. When this temperature is reached, the diazotized solution of 108 lbs. of toluidine is added slowly, as in a small stream, until a test shows only a trace of the pyrazolone in excess to the diazonium compound. This test may be made as in the prior example by salting out on filter paper a drop of the reacting solution to form a colorless ring and placing a drop of the diazotized solution on the paper at one side of the ring so that at the edges and junctions of both a color test will appear. The addition of the diazotized solution is continued until the test shows only a trace of the pyrazolone in excess to the diazonium salt. During the reaction the temperature should be kept low, preferably from 0° C. to 5° C. and the reacting solution should be free from inorganic acids, preferably neutral or alkaline, as in the prior example. The dye is removed in the manner explained in the prior example.

As a further example of the preparation of the novel dye, 350 lbs. of pyrazolone may be dissolved in a solution of 200 lbs. of soda ash in 1600 lbs. of water. When a clear solution is obtained, 1250 lbs. or more of ice are added until the temperature of the solution is reduced to 5° C. or lower, preferably about 5° C. When this temperature is reached the diazotized solution of 123 lbs. of xylidine is added slowly, as in a small stream, until a test shows only a trace of the pyrazolone in excess to the diazonium compound. This test may be made as in the prior example by salting out on filter paper a drop of the reacting solution to form a colorless ring and placing a drop of the diazotized solution on the paper at one side of the ring so that at the edges and junctions of both a color test will appear. The addition of the diazotized solution is continued until the test shows only a trace of the pyrazolone in excess to the diazonium salt. During the reaction the temperature should be kept low, preferably from 0° C. to 5° C. and the reacting solution should be free from inorganic acids, preferably neutral or alkaline, as in the prior example. The dye is removed in the manner explained in the prior example.

The dyes obtained by this improved method start to "draw out" at a low temperature and consequently the "bath" is exhausted gradually. These dyes form greenish-yellow to orange-yellow powders, dissolve partially in cold water, completely and easily in hot water, dissolve in concentrated sulphuric acid forming a yellow to orange-yellow solution, in the form of their lakes possess a yellow color, upon reduction with tin and hydrochloric acid yield an amidopyrazolone and aniline or its homologues or halogen substitutes.

Claims:

1. The process for the manufacture of dyes which comprises coupling with a halogen-substituted pyrazolone, a diazotized unsulphonated material selected from the group consisting of aniline, homologues of aniline and halogen substitution products of aniline.

2. The process for the manufacture of dyes which comprises coupling with a halogen-substituted pyrazolone, a diazotized unsulphonated material selected from the group consisting of aniline, homologues of aniline and halogen substitution products of aniline.

3. The process for the manufacture of dyes which comprises coupling with a dichlor-substituted pyrazolone, a diazotized unsulphonated material selected from the group consisting of aniline, homologues of aniline and halogen substitution products of aniline.

4. The process for the manufacture of dyes which comprises coupling with a halogen-substituted pyrazolone, at a temperature between 0° C. and +5° C., a diazotized unsulphonated material selected from the group consisting of aniline, homologues of aniline and halogen substitution products of aniline.

5. The process for the manufacture of dyes which comprises reducing a quantity of a chlor-substituted pyrazolone, to a temperature below +5° C. and above 0° C. and reacting therewith by the addition of a solution of diazotized, unsulphonated material selected from the group consisting of aniline, homologues of aniline and halogen substitution products of aniline.

6. The process for the manufacture of dyes which comprises reducing a quantity of dichlor-substituted pyrazolone to a temperature below +5° C. and reacting therewith by the addition of a solution of a diazotized unsulphonated material selected from the group consisting of aniline, homologues of aniline and halogen substitution products of aniline.

7. The process of manufacturing dyes which comprises dissolving a pyrazolone in a solution free from inorganic acids, and adding thereto a quantity of a diazotized unsulphonated material selected from the group consisting of aniline, homologues of aniline and halogen substitution products of aniline, with at least always a trace of pyrazolone in excess and then precipitating the dye.

8. The process of manufacturing dyes which comprises coupling with a halogen-substituted pyrazolone at a temperature below +5° C., a diazotized unsulphonated material selected from the group consisting of aniline, homologues of aniline, and halogen substitution products of aniline, then raising the temperature of the product above +40° C. and then precipitating the dye.

9. The process of manufacturing dyes which comprises coupling with dichlor-sulpho-phenyl-methyl pyrazolone, a diazotized unsulphonated material selected from the group consisting of aniline, homologues of aniline and halogen substitution products of aniline.

10. The process of manufacturing dyes which comprises coupling with dichlor-sulpho-phenyl-methyl pyrazolone, in a bath free from inorganic acids, a diazotized unsulphonated material selected from the group consisting of aniline, homologues of aniline and halogen substitution products of aniline.

11. The process of manufacturing dyes which comprises chilling an alkaline solution of a halogen-substituted pyrazolone to a temperature below +5° C. and then adding slowly thereto a solution of diazotized unsulphonated material selected from the group consisting of aniline, homologues of aniline and halogen substitution products of aniline, with at least a trace of pyrazolone always in excess.

12. The process of manufacturing dyes which comprises chilling an alkaline solution of a halogen-substituted pyrazolone to a temperature below +5° C. and then adding slowly thereto a solution of diazotized unsulphonated material selected from the group consisting of aniline, homologues of aniline and halogen substitution products of aniline, with at least a trace of pyrazolone always in excess, then heating the product slowly until its temperature is above +40° C. and then precipitating the dye.

13. The process of manufacturing dyes which comprises chilling an alkaline solution of a halogen-substituted pyrazolone to a temperature below +5° C. and then adding slowly thereto a solution of a diazotized unsulphonated material selected from the group consisting of aniline, homologues of aniline and halogen substitution products of aniline while maintaining the reacting solutions free from inorganic acids with the pyrazolone in excess.

14. The process of manufacturing dyes which comprises adding slowly to an alkaline solution of dichlor-sulpho-phenyl-methyl pyrazolone, a solution of diazotized unsulphonated material selected from the group consisting of aniline, homologues of aniline and halogen substitution products of aniline, with the pyrazolone always in excess, and then precipitating the dye.

15. The yellow coloring matter which may be obtained by coupling to halogen-substitution products of pyrazolone, a diazotized unsulphonated material selected from the group consisting of aniline, homologues of aniline and halogen substitution products of aniline; the matter being capable of dyeing silk and wool in acidulated baths.

16. The yellow coloring matter which may be obtained by coupling to halogen-substitution products of pyrazolone, a diazotized unsulphonated material selected from the group consisting of aniline, homologues of aniline and halogen substitution products of aniline; the coloring matter being a yellow powder which is fast to light, partially soluble in cold water and completely and easily soluble in hot water producing yellow solutions, soluble in concentrated sulphuric acid producing a yellow to orange-yellow solution, which dyes wool and silk in an acidulated bath, which in the form of lakes possesses a yellow color, and which upon reduction with tin and hydrochloric acid yields an amido pyrazolone and an unsulphonated material selected from the group consisting of aniline, homologues of aniline and halogen substitutes of aniline.

In witness whereof I hereunto subscribe my signature.

EUGENE A. MARKUSH.